Sept. 13, 1960 J. A. HILL 2,952,350
EGG CONVEYOR
Filed June 21, 1957 2 Sheets-Sheet 1

JOSHUA A. HILL,
INVENTOR.

BY HIS ATTORNEYS

Harris, Kiech, Foster & Harris.

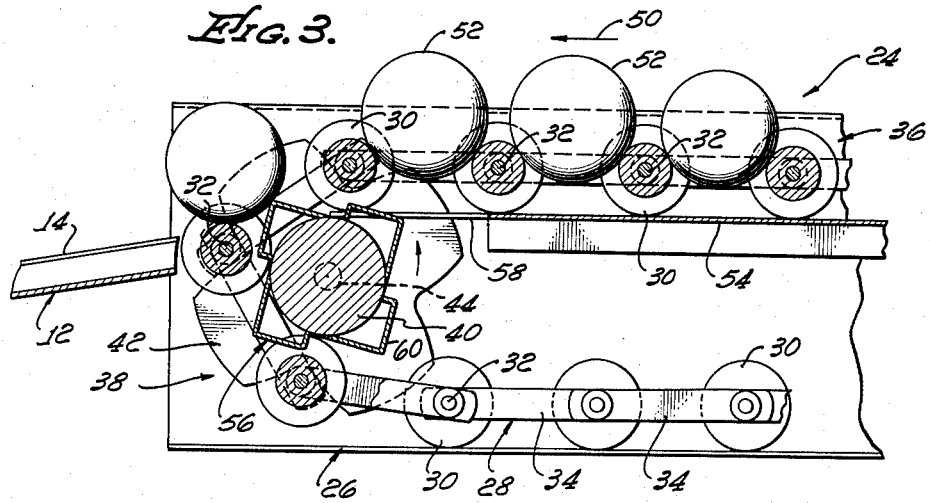
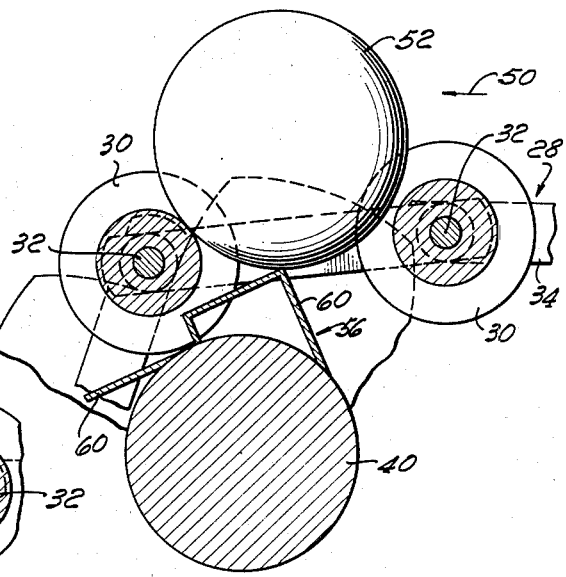
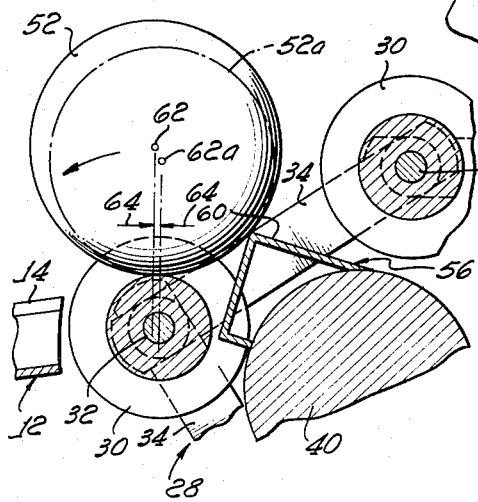

United States Patent Office 2,952,350
Patented Sept. 13, 1960

2,952,350

EGG CONVEYOR

Joshua A. Hill, 20248 Leadwell St., Canoga Park, Calif.

Filed June 21, 1957, Ser. No. 667,171

2 Claims. (Cl. 198—25)

The present invention relates in general to conveyor systems and, more particularly, to an egg conveyor system, a primary object of the invention being to provide an egg conveyor having means for smoothly and gently discharging eggs of all sizes onto a second conveyor of the system.

Generally speaking, the present invention contemplates an egg conveyor which includes an endless conveyor member trained around two spaced, parallel, substantially horizontal guide members, such as sprockets, on substantially the same horizontal level, the conveyor member including transverse conveyor elements, such as concave rollers, spaced apart longitudinally to receive eggs of various sizes therebetween. As the conveyor member moves downwardly around one of the sprockets, or other guide members, the eggs are discharged from between the rollers, or other conveyor elements, and are transferred to the second conveyor, which may lead to an apparatus for grading the eggs according to weight, or to other apparatus.

The second conveyor may merely be a track means comprising two parallel rails, formed by the edges of a channel, for example, along which the eggs roll, such a track means being disclosed in my Patent No. 2,442,689, issued June 1, 1948, and in my Patent No. 2,585,124, issued February 12, 1952.

If, with an egg conveyor of the foregoing character, the track means to which the eggs are transferred is so positioned relative to the discharge end of the conveyor that large eggs fall from between the rollers onto the track means gently and smoothly, there is a tendency to crush small eggs between the inlet end of the track means and the following rollers. On the other hand, if the inlet end of the track means is so positioned relative to the discharge end of the roller-type conveyor that small eggs are transferred gently and smoothly, large eggs fall onto the inlet end of the track means through an excessive distance and are therefore subject to the possibility of breakage.

A basic object of the present invention is to provide an egg conveyor of the foregoing nature having means for transferring eggs of all sizes, ranging from "extra large" to "pee-wees," from the discharge end of the conveyor to the inlet end of a second conveyor, such as the track means discussed above, in a smooth and gentle manner with no tendency to crush small eggs between the inlet end of the track means and following rollers and with no tendency to drop even very large eggs onto the inlet end of the track means through excessive distances.

More particularly, an important object of the invention is to provide an egg conveyor having ejector means located inwardly of the path of the conveyor elements or rollers at the discharge end of the egg conveyor for discharging the eggs outwardly from between the rollers onto the inlet end of the second conveyor in such a manner that eggs of all sizes are transferred smoothly and gently in exactly the same fashion, there being no tendency to transfer eggs of one size more or less gently or smoothly than eggs of any other size.

Another object is to provide ejector means which discharge the eggs from between the conveyor rollers at points on the path of movement of the conveyor rollers ahead of the points at which the eggs would fall from between the conveyor rollers in the absence of the ejector means, and to so position the second conveyor or track means relative to the discharge end of the roller-type conveyor that eggs of various sizes engage the inlet end of the track means with substantially no impact.

Another object is to provide an egg conveyor wherein the ejector means mentioned is carried by the sprocket at the discharge end of the egg conveyor and includes a plurality of circumferentially spaced ejector members the pitch of which is equal to the pitch of the conveyor rollers.

Another object is to provide an egg conveyor which includes a track under the upper run of the conveyor member for supporting very small eggs which are too small to be supported by a pair of adjacent conveyor rollers alone, such very small eggs being discharged by the ejector means onto the inlet end of the second conveyor in precisely the same manner as larger eggs.

The foregoing objects, advantages, features and results of the present invention, together with various other objects, advantages, features and results thereof which will be evident to those skilled in the art in the light of this disclosure, may be achieved with the exemplary embodiment of the invention described in detail hereinafter and illustrated in the accompanying drawings, in which:

Fig. 3 is an enlarged sectional view taken along the arrowed line 3—3 of Fig. 1;

Figs. 4 and 5 are further enlarged, fragmentary sectional views duplicating a portion of Fig. 3 and illustrating the discharge action of the egg conveyor of the invention.

Figure 1:
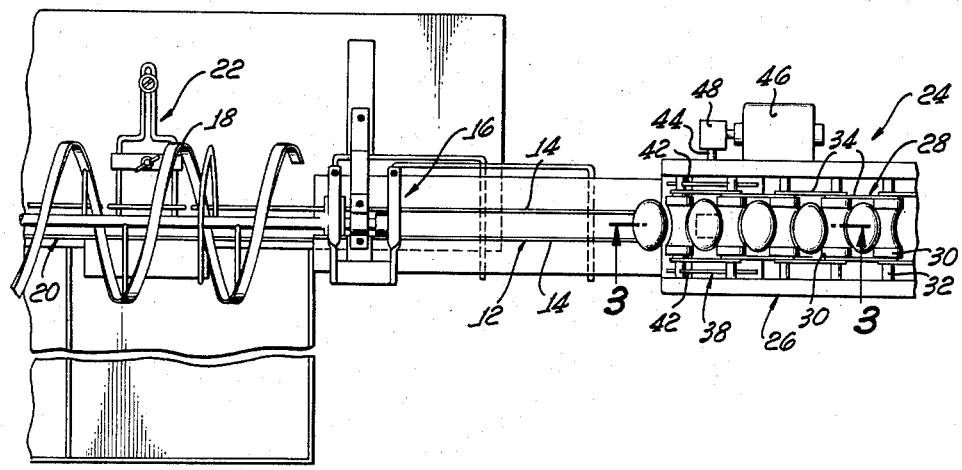
Fig. 1 is a plan view of an apparatus which employs the egg conveyor of the present invention to feed eggs to an apparatus for grading eggs according to weight.
Figure 2:
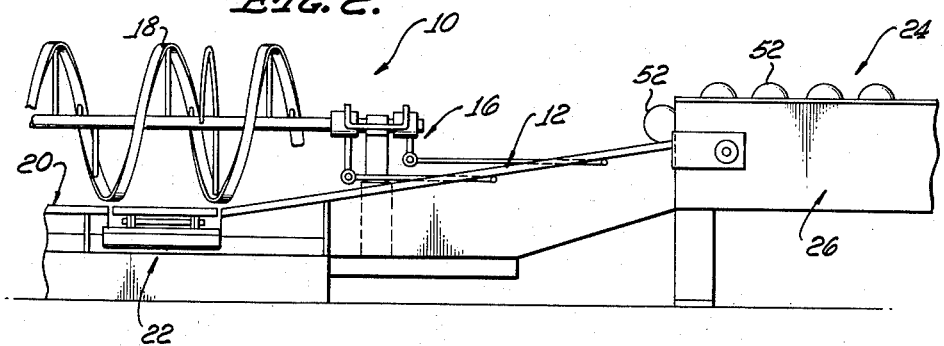
Fig. 2 is a front elevational view of the apparatus illustrated in Fig. 1.
Figure 6:
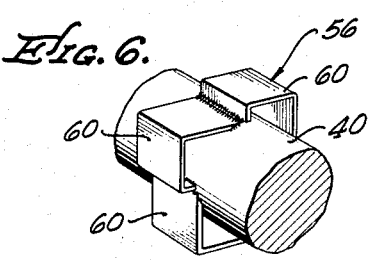
Fig. 6 is a fragmentary perspective view illustrating an ejector means of the invention.

Referring first to Figs. 1 and 2 of the drawings, illustrated therein in fragmentary form is the egg grading machine of my aforementioned Patent No. 2,585,124, this machine being designated by the numeral 10. The machine 10 includes a feeder conveyor 12 in the form of a track means having two spaced, parallel rails 14 along which eggs are adapted to roll, the conveyor or track means 12 sloping downwardly to a gate means, designated generally by the numeral 16, for admitting the eggs one at a time to a spiral conveyor or worm 18. The latter rolls the eggs along a track means 20 having therein a plurality of scale means 22, only one of which is shown, for grading the eggs according to weight, all as disclosed in more detail in my aforementioned patents.

Prior to the present invention, it was necessary for the operator of the egg grading machine 10 to place the eggs to be graded on the track means 12 upstream from the gate means 16. Since the track means 12 is formed by the two rails 14, some care in placing the eggs thereon was necessary to insure that the eggs were properly located relative to the rails 14, which was somewhat time consuming. The present invention provides an egg conveyor 24 for feeding eggs one at a time to the track means 12 in the proper positions relative to the rails 14 in a completely automatic manner and without any attention on the part of the operator, the conveyor 24 being so designed that it will feed the eggs to the track means 12 one at a time in the proper manner even though the eggs are placed on the conveyor 24 in indiscriminate fashion.

Considering the egg conveyor 24, it includes a supporting structure 26 for an endless conveyor member 28, the latter including a plurality of transverse concave rollers 30 spaced apart longitudinally of the conveyor member. The rollers 30 are provided with axles 32 which project axially beyond the ends of the rollers and which are interconnected by links 34. The conveyor member 28 is trained around two spaced, parallel, substantially horizontal sprockets which are carried by the supporting structure 26 on substantially the same horizontal level to provide the conveyor member with a generally horizontal upper run 36, only one of the sprockets being visible in the drawings and being designated by the numeral 38. The sprocket 38 includes a hub 40 having at its ends toothed flanges 42 which engage the axles 32 of the rollers 30. The egg conveyor 24 may be driven in any suitable manner, as by means of a shaft connected to a hub 40 of the sprocket 38 and driven by an electric motor 46 through reduction gearing 48.

As best shown in Fig. 3 of the drawings, the conveyor member 28 is driven in the direction of the arrow 50 and the concave rollers 30 thereof are adapted to receive eggs 52 therebetween, which eggs may be of various sizes. The rollers 30 of the upper run 36 roll along a track 54 having the form of a plate disposed under the rollers of the upper run and carried by the supporting structure 26. The resulting rotation of the rollers 30 has an aligning effect on eggs 52 placed between the rollers, tending to align the longitudinal axes of the eggs with the axes of the rollers. Consequently, it is not necessary for the operator to place the eggs 52 between the rollers 30 accurately. Also, if a very small egg, small enough to drop between the rollers 30, is placed between a pair of such rollers, it will nevertheless be conveyed along the track 54, which may simply be a plate, by the roller which follows it.

As the conveyor member 28 moves downwardly over the sprocket 38, the eggs 52 are discharged from between the rollers onto the track means 12 by an ejector means 56 projecting radially from the hub 40 of the sprocket 38, the track 54 having a slot 58 therein to receive the ejector means. The ejector means 56 comprises a plurality of circumferentially spaced ejector members 60 the pitch of which is equal to the pitch of the rollers 30 so that the ejector members and the rollers are synchronized, each ejector member, which has the form of a step-like projection on the sprocket hub 40 in the particular construction illustrated, being inserted between the rollers 30 of each pair of such rollers as the conveyor member 28 moves downwardly around the sprocket 38.

Considering the operation of the invention, the operator merely places the eggs 52 on the upper run 36 of the conveyor member 28, it being unnecessary that the eggs be placed between the rollers 30 accurately since the rotation of the rollers produced by their engagement with the track 54 has an aligning effect on the eggs, as hereinbefore discussed. As each egg 52 reaches the discharge end of the egg conveyor 24, it is engaged by one of the ejector members 60, as best shown in Figs. 4 and 5, which ejector member is inserted between the pair of rollers between which the egg is disposed. As shown in Fig. 5, the ejector member 60 in engagement with a particular egg 52 swings such egg about the axis of the roller 30 ahead of it into a position such that the egg ultimately rolls off the preceding roller onto the inlet end of the track means 12. The track means 12 is so located that the ejector members 60 roll the eggs 52 off the preceding rollers 30 onto the inlet end of the track means smoothly and gently, this being accomplished by locating the inlet end of the track means closely adjacent the roller path, as shown in Fig. 5, and above the position of the axis of each roller as the following egg 52 is discharged therefrom by one of the ejector members 60.

As shown in Fig. 5 of the drawings, the roller 30 which supports the egg 52 and the corresponding ejector member 60 have reached positions such that the center, 62, of the egg has been moved beyond the axis of the preceding roller 30 a distance indicated by the dimensional arrows 64. Thus, the egg 52 shown in Fig. 5 is about to roll off the roller 30 which precedes it onto the inlet end of the track means 12. As will be apparent from the relative positions of the inlet end of the track means 12 and the egg 52 shown in Fig. 5, this egg will roll off onto the track means 12 smoothly and gently. The numeral 52a in Fig. 5 designates a smaller egg which is also in engagement with one of the rollers 30 and one of the ejector members 60. The center of the egg 52a, which is designated by the numeral 62a, is directly above the axis of the preceding roller 30 so that it is not quite ready to roll off the preceding roller onto the inlet end of the track means 12. However, upon slight downward movement of the roller 30 preceding the smaller egg 52a, this egg will roll off onto the inlet end of the track means 12 and, by the time it does, it will occupy substantially the same position relative to the inlet end of the track means 12 as that shown for the larger egg 52 in Fig. 5. Similar considerations are applicable to an egg smaller that the egg 52a, still further downward movement of the preceding roller 30 being required before one of the ejector members 60 discharges it. Thus, the ejector members 60 cooperate with the rollers 30 to discharge eggs of all sizes onto the inlet end of the track means 12 in exactly the same fashion, eggs of all sizes rolling onto the track means 12 with the same degree of gentleness and smoothness. This action occurs even with "pee-wees" which may be so small that they do not rest on the rollers 30 between which they are placed, but rest on the track 54 and roll therealong under the influence of the following rollers. As previously discussed, in the absence of the ejector members 60, the roller 30 preceding each egg 52 would have to move downwardly to a much lower level than shown in Figs. 3 to 5 of the drawings before the egg would be discharged by the following roller. With this construction, the inlet end of the track means 12 would have to be at a correspondingly lower elevation and, while the track means could be so positioned relative to the discharge end of the egg conveyor 24 as to transfer eggs of one size satisfactorily such a structure would tend to crush smaller eggs between the inlet end of the track means 12 and the following rollers and would tend to drop larger eggs onto the track means 12 through too great a distance with the possibility of consequent damage thereto. The present invention overcomes these problems by providing the ejector members or "kickers" 60 which discharge the eggs at higher levels and which cooperate with the rollers 30 preceding eggs of various sizes in such a manner as to discharge eggs of all sizes when they reach a predetermined distance from the inlet end of the track means 12, whereby eggs of all sizes are transferred to the track means 12 with the same degree of gentleness and smoothness.

Thus, the present invention provides a means of feeding eggs one at a time to the track means 12 in the proper position relative to such track means even though the eggs are placed on the conveyor 24 in random fashion, any eggs placed on the conveyor 24 in misaligned positions being aligned automatically by the rollers 30. Also, the transfer from the conveyor 24 to the track means 12 is effected uniformly for eggs of all sizes due to the action of the ejector means 56, which is an extremely important feature of the invention.

Although an exemplary embodiment of the invention has been disclosed herein for purposes of illustration, it will be understood that various changes, modifications and substitutions may be incorporated in such embodi-

I claim:

1. In an egg conveyor, the combination of: two spaced, parallel, substantially horizontal sprockets on substantially the same horizontal level; an endless conveyor member trained around said sprockets and movable downwardly around one of said sprockets, said conveyor member including transverse, concave rollers spaced apart longitudinally of said conveyor member and adapted to receive eggs therebetween; and ejector means carried by and rigidly connected to said one sprocket so as to rotate therewith and engageable with eggs between said rollers as said conveyor member moves downwardly around said one sprocket for discharging the eggs from between said rollers, said ejector means including a plurality of circumferentially spaced ejector members which are spaced from said rollers and the pitch of which is equal to the pitch of said rollers.

2. In an egg conveyor, the combination of: two spaced, parallel, substantially horizontal sprockets on substantially the same horizontal level; an endless conveyor member trained around said sprockets and movable downwardly around one of said sprockets, said conveyor member including transverse, concave rollers spaced apart longitudinally of said conveyor member and adapted to receive eggs therebetween; ejector means coaxial with and rotatable about the axis of said one sprocket and engageable with eggs between said rollers as said conveyor member moves downwardly around said one sprocket for discharging the eggs from between said rollers, said ejector means including a plurality of circumferentially spaced ejector members which are spaced from said rollers and the pitch of which is equal to the pitch of said rollers; and means for rotating said one sprocket and said ejector means in the same direction and at the same speed.

References Cited in the file of this patent

UNITED STATES PATENTS

| | | |
|---|---|---|
| 1,284,031 | Ahlburg | Nov. 5, 1918 |
| 2,070,980 | Wyland | Feb. 16, 1937 |
| 2,698,694 | Schwartz et al. | Jan. 4, 1955 |
| 2,724,485 | Reading | Nov. 22, 1955 |